Nov. 28, 1950 — W. F. ERRIG ET AL — 2,532,156
TIRE GROOVER
Filed March 18, 1948 — 2 Sheets-Sheet 1

INVENTORS.
WILLIAM F. ERRIG
EDWARD S. DE HART
ATTORNEY

Nov. 28, 1950 W. F. ERRIG ET AL 2,532,156
TIRE GROOVER
Filed March 18, 1948 2 Sheets-Sheet 2

INVENTORS.
WILLIAM F. ERRIG
EDWARD S. DE HART
BY
ATTORNEY

Patented Nov. 28, 1950

2,532,156

UNITED STATES PATENT OFFICE 2,532,156

TIRE GROOVER

William F. Errig, Jenkintown, Pa., and Edward S. De Hart, Collingswood, N. J., assignors, by mesne assignments, to said Errig Application March 18, 1948, Serial No. 15,634

7 Claims. (Cl. 82—1)

This invention relates to tire groovers, and more particularly to apparatus for grooving, regrooving, or otherwise shaping the exterior surface of a pneumatic tire casing.

It has heretofore been proposed to provide apparatus for tire grooving such as that shown in prior Patent No. 1,916,258, to William F. Errig and George M. Pfundt. While the tire groover shown in that patent has generally proven satisfactory, different sizes of tires to be grooved or regrooved necessitated the use of different sizes of machines to cover the wide range of tire sizes. Additionally, the insertion and positioning of the tire at the operating position, and the removal thereof after the completion of the grooving operations were rather difficult, particularly with larger sizes of tires. Furthermore, the provisions for maintaining the tires in position during rotation were not as positive in their action as desired.

It is the principal object of the present invention, therefore, to provide an improved tire grooving machine which will overcome the objectionable features heretofore encountered and which will operate in an improved manner.

It is a further object of the present invention to provide an improved tire groover which, by reason of its construction, is adapted for use with a wider range of sizes of tires than machines heretofore available.

It is a further object of the present invention to provide, in a tire groover, improved provisions for causing the tire to be positively positioned during rotation for the grooving operation.

It is a further object of the present invention to provide a tire groover which will permit of easier mounting and removal of the tire to be grooved, thereby facilitating the use thereof.

It is a further object of the present invention to provide a tire groover having a supporting frame which is sturdy and rigid and which will withstand the rough handling which machines are accorded in garages, service stations and the like.

Other objects and advantageous features of the invention will be apparent from the specification and claims.

The nature and characteristic features of the invention will be more readily understood from the following description, taken in connection with the accompanying drawings forming part hereof, in which.

Like numerals refer to like parts throughout the several views.

Figure 1:
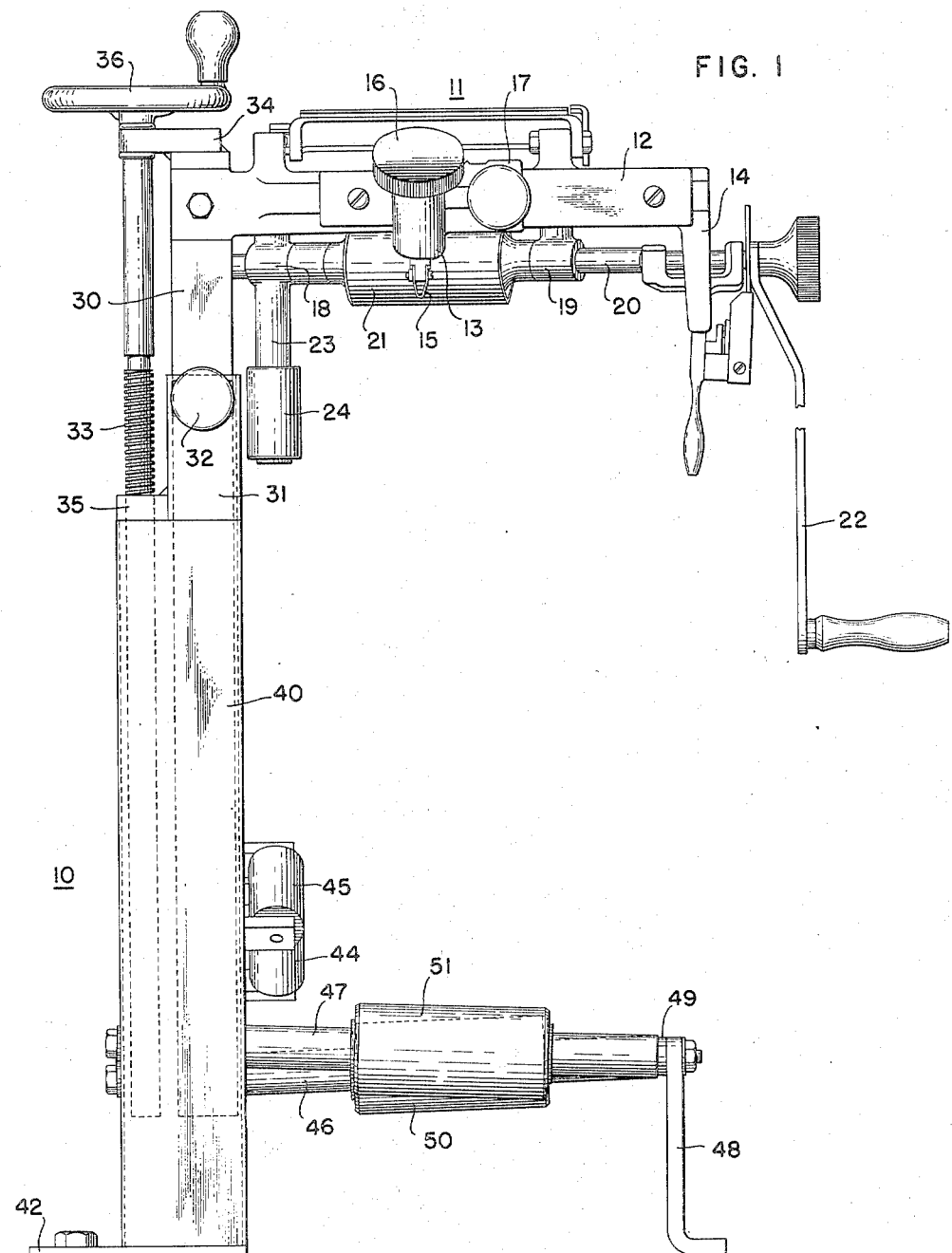
Figure 1 is aside elevational view of a tire groover in accordance with the present invention.
Figure 2:
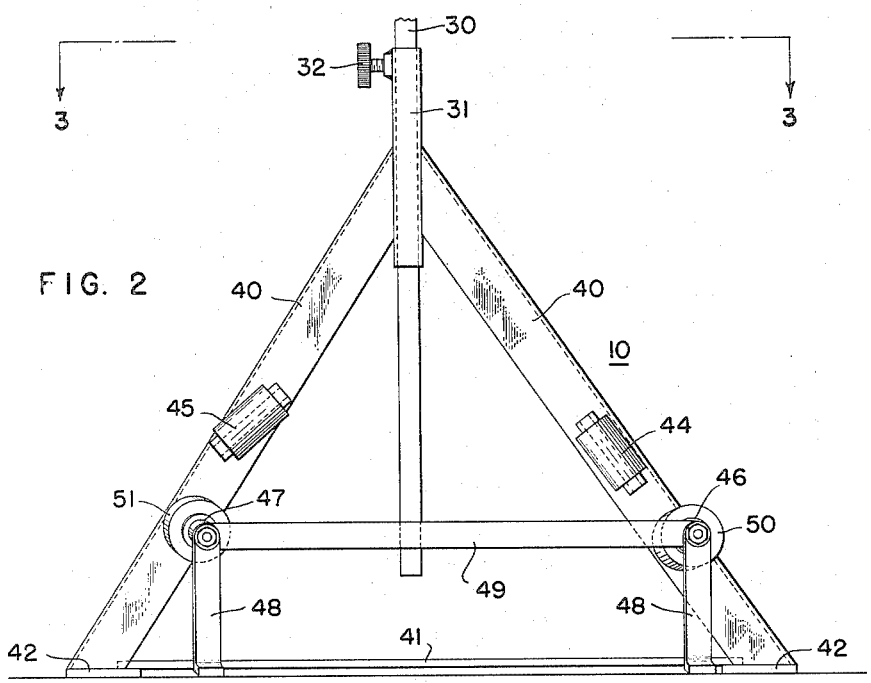
Fig. 2 is an end elevational view of the lower portion thereof.
Figure 3:
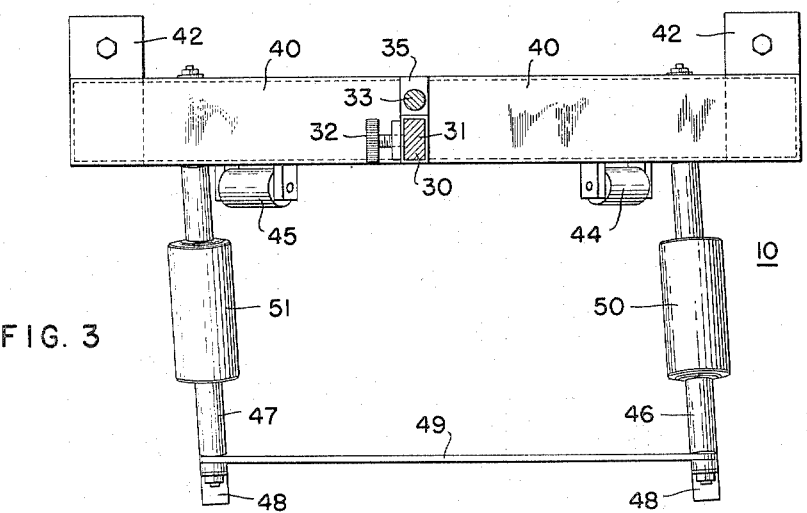
Fig. 3 is a horizontal sectional view taken approximately on the line 3—3 of Fig. 2.

It should, of course, be understood that the description and drawings herein are illustrative merely, and that various modifications and changes may be made in the structure disclosed without departing from the spirit of the invention.

Referring more particularly to the drawings, in which a preferred embodiment of the invention is illustrated, a framework or supporting base 10 is provided on which a carriage 11 is mounted, the carriage 11 being substantially of the type illustrated in Patent No. 1,916,258.

The carriage 11 preferably includes a supporting bar 12 on which a tool holder or head 13 is mounted. The head 13 is provided with an adjusting member 17 movable longitudinally on the bar 12, which is adapted to carry a cutter 15, the cutter 15 being adjustable for depth of cut by a rotatable head portion 16.

The carriage 11 also has carried thereon, in bearings 18 and 19, a shaft 20 on which a driving roller 21 is mounted. The axis of the shaft 20 and the driving roller 21 carried thereby is positioned at a predetermined angle so as to aid in positioning the wheel or tire to be tested and for this purpose is offset or inclined at an angle of about three degrees from a radius taken from the mean center. The shaft 20 and the roller 21 thereon are adapted to be rotated in any suitable manner, such as by an operating crank 22 on the outer or free end thereof.

The carriage 11 also has mounted thereon, at the inner end thereof, a vertical spindle 23 in which a roller 24 is freely rotatably mounted.

The carriage 11 is adapted to be supported upon a post 30 which, below the innermost end of the carriage 11, is rectangular in horizontal cross section and is slidable vertically within a tube 31, complemental in shape to the post 30, forming part of the base 10. A clamping stud 32 is provided for clamping the post 30 at the desired position of adjustment in the tube 31.

In order to vertically position the post 30 and the carriage 11 supported thereby, a vertically disposed threaded rod 33 is provided, journaled in a bracket 34 carried on the upper end of the post 30. The threaded rod 33 is in engagement with a nut 35 secured to the tube 31. An operating wheel 36 is provided at the upper end of the rod 33 for turning the rod 33 and thereby raising and lowering the carriage 11.

The tube 31 has secured thereto a pair of hollow legs 40 rectangular in cross section and disposed in inverted V shape. The legs 40 are connected at their lower ends by a horizontal brace bar 41 and are each provided at their lower extremities with a clamping plate 42 for securing the same in position at the place of use.

One of the legs 40 has a roller 44 rotatably mounted thereon, and the other of the legs 40 has a roller 45 rotatably mounted thereon. The longitudinal axis of the roller 44 is at an angle to the longitudinal axis of the leg 40 on which it is mounted and the longitudinal axis of the roller 45 is at a greater angle with respect to the leg 40 on which it is mounted. The roller 45 may also be mounted at a higher level on the leg 40 than the location of the roller 44, thus accommodating tires of different sizes as hereinafter more fully explained.

At the lower portion of one of the legs 40, a shaft 46 is provided and at the lower portion of the other leg 40 a shaft 47 is provided. The shafts 46 and 47 are supported at their outer ends upon feet 48 and with a connecting brace 49 therebetween for stiffening.

The shafts 46 and 47 have separate rollers 50 and 51 mounted thereon for free rotation. The shafts 46 and 47 are positioned at special predetermined angles so that the shaft 47 and the roller 51 carried thereby are disposed with their axes inclined downwardly and inwardly and the shaft 46 and its roller 50 are disposed with their axes inclined upwardly and outwardly. The positioning of the shafts 46 and 47 is preferably determined by ascertaining the mean tire height of the tires to be grooved with the particular machine and the axes of the rollers 50 and 51 offset or inclined at an angle of about three degrees from a radius taken from the mean center. With the driving roller 21 positioned as previously indicated and with this positioning of the rollers 50 and 51 on which the tire to be grooved is supported the tire, upon rotation of the driving roller 21 in engagement with its periphery, will move to the left in Fig. 1 and to a position in engagement with the roller 24 carried by the carriage 11 and the rollers 44 and 45 carried by the legs 40, and remain in such engagement upon rotation.

The mode of use, will be apparent from the foregoing. It may be noted however, that a tire casing, preferably mounted on a wheel and with the tube inflated is placed with its periphery in engagement with the rollers 50 and 51 and the carriage 11 is then positioned, by turning the wheel 36 so that the roller 21 is in engagement with the periphery of the tire casing. Upon turning of the handle 22 the tire casing will move inwardly into engagement with the rollers 24, 45 and 46, by reason of the positioning of the rollers 50 and 51, and upon continued turning of the handle 22, will be held in engagement and rotated. The cutter 15 may then be positioned by movement of the member 17, and adjusted for depth of cut by adjustment of the head portion 16.

We claim:

1. In a tire groove, a frame having members on one side thereof for engagement by the side of a tire casing, a vertically movable carriage extending from said side of said frame, shafts extending outwardly from said side of said frame, rollers carried by said shafts for supporting engagement with the periphery of a tire casing, the axis of each of said rollers being nonparallel and inclined at a slight angle with respect to the diametral plane of the tire casing for impelling the casing into engagement with said first mentioned members, a driving member for engagement with the tire casing, and a cutter member on said carriage for engagement with the periphery of the tire casing for forming a groove therein.

2. In a tire groover, a frame, a vertically movable carriage extending from one side of said frame, shafts extending outwardly from said frame on the same side thereof, rollers carried by said shafts for supporting engagement with the periphery of a tire casing, the axis of each of said rollers being inclined at a slight angle with respect to the diametral plane of the tire casing for impelling the casing into position, one of said axes being inclined downwardly and inwardly and the other of said axes being inclined upwardly and outwardly, a driving member for engagement with the tire casing, and a cutter member on said carriage for engagement with the periphery of the tire casing for forming a groove therein.

3. In a tire groover, a frame, a vertically movable carriage extending from one side of said frame, shafts extending outwardly from said frame on the same side thereof, rollers carried by said shafts for supporting engagement with the periphery of a tire casing, a driving roller for engagement with the periphery of the tire casing, the axis of each of said rollers being each inclined at a slight angle with respect to the diametral plane of the tire casing for impelling the casing into grooving position, and a cutter member on said carriage for engagement with the periphery of the tire casing for forming a groove therein.

4. In a tire groover, a frame having an upper vertical tubular member of non-circular cross-section, a post having a portion thereof complemental to and vertically slidably mounted in the interior of said tubular member and held against rotation with respect thereto, a carriage supported at one end by and extending horizontally outwardly from said post, shafts extending outwardly from lower portions of said frame, rollers carried by said shafts for supporting engagement with the periphery of a tire casing, a driving member on said carriage for driving engagement with the periphery of the tire casing, and a cutter member on said carriage for engagement with the periphery of the tire casing for forming a groove therein.

5. In a tire groover, a frame having an upper vertical tubular member of non-circular cross-section and lower outwardly flaring supporting members for said tubular member, a post having a portion thereof complemental to and vertically slidably mounted on said tubular member and held against rotation with respect thereto, a carriage supported at one end by and extending horizontally outwardly from said post, shafts extending outwardly from lower portions of said frame, rollers carried by said shafts for supporting engagement with the periphery of a tire casing and having the axes of each inclined at a slight angle with respect to the diametral plane of the tire casing for impelling the casing toward said frame, a driving member on said carriage for driving engagement with the periphery of the tire casing, and a cutter member on said carriage for engagement with the periphery of the tire casing for forming a groove therein.

6. In a tire groover, a frame having an upper vertical tubular member of non-circular cross-section and lower outwardly flaring supporting members for said tubular member, a post having a portion thereof complemental to and vertically slidably mounted on said tubular member and held against rotation with respect thereto, a carriage supported at one end by and extending horizontally outwardly from said post, shafts extending outwardly from lower portions of said frame, rollers carried by said shafts for supporting engagement with the periphery of a tire casing, a connecting member between the outer ends of said shafts, supporting brackets for said connecting member, a driving member on said carriage for driving engagement with the periphery of the tire casing, and a cutter member on said carriage for engagement with the periphery of the tire casing for forming a groove therein.

7. In a tire groover, a frame having an upper vertical tubular member of non-circular cross-section and lower outwardly flaring supporting members for said tubular member, rollers mounted on said frame with their axes in a vertical plane for engagement with the side wall of a tire casing, a post having a portion thereof complemental to and vertically slidably mounted on said tubular member and held against rotation with respect thereto, a carriage supported at one end by and extending horizontally outwardly from said post, shafts extending outwardly from lower portions of said frame, rollers carried by said shafts for supporting engagement with the periphery of a tire casing and having the axes of each inclined at a slight angle with respect to the diametral plane of the tire casing for impelling the casing into engagement with said first mentioned rollers, one of said axes being inclined downwardly and inwardly and the other of said axes being inclined upwardly and outwardly, a driving member on said carriage for driving engagement with the periphery of the tire casing, and a cutter member on said carriage for engagement with the periphery of the tire casing for forming a groove therein.

WILLIAM F. ERRIG.
EDWARD S. DE HART.

REFERENCES CITED

The following references are of record in the file of this patent:

UNITED STATES PATENTS

| Number | Name | Date |
|---|---|---|
| 1,916,258 | Errig | July 4, 1933 |

FOREIGN PATENTS

| Number | Country | Date |
|---|---|---|
| 843,446 | France | July 3, 1939 |